United States Patent
Yu et al.

(10) Patent No.: US 11,566,098 B2
(45) Date of Patent: Jan. 31, 2023

(54) GRAPHENE-MODIFIED ELASTOMER MATERIAL AND ITS PREPARATION METHOD

(71) Applicant: Zhejiang Yuanrong Technology Co., Ltd, Hangzhou (CN)

(72) Inventors: Songmao Yu, Hangzhou (CN); Lvming Xiao, Hangzhou (CN); Yangang Yu, Hangzhou (CN); Wanqin Zhang, Hangzhou (CN); Qiwei Zheng, Hangzhou (CN)

(73) Assignee: ZHEJIANG YUANRONG TECHNOLOGY CO., LTD, Hangzhou (CN)

( * ) Notice: Subject to any disclaimer, the term of this patent is extended or adjusted under 35 U.S.C. 154(b) by 395 days.

(21) Appl. No.: 16/747,555

(22) Filed: Jan. 21, 2020

(65) Prior Publication Data
US 2020/0291167 A1 Sep. 17, 2020

(30) Foreign Application Priority Data

Mar. 11, 2019 (CN) .......................... 201910181599.6

(51) Int. Cl.
| | |
|---|---|
| *C08K 3/04* | (2006.01) |
| *C08G 18/12* | (2006.01) |
| *C08G 18/48* | (2006.01) |
| *C08K 9/06* | (2006.01) |
| *C08K 3/34* | (2006.01) |

(52) U.S. Cl.
CPC .......... *C08G 18/12* (2013.01); *C08G 18/4841* (2013.01); *C08K 3/042* (2017.05); *C08K 3/34* (2013.01); *C08K 9/06* (2013.01)

(58) Field of Classification Search
CPC .... C08G 18/10; C08G 18/12; C08G 18/4841; C08G 18/482; C08K 3/042
See application file for complete search history.

(56) References Cited

U.S. PATENT DOCUMENTS

| | | | | |
|---|---|---|---|---|
| 4,433,067 A | * | 2/1984 | Rice ................... | C08G 18/6685 |
| | | | | 264/DIG. 83 |
| 4,444,910 A | * | 4/1984 | Rice ...................... | C08G 18/10 |
| | | | | 264/DIG. 83 |
| 4,607,090 A | * | 8/1986 | Dominguez ....... | C08G 18/5024 |
| | | | | 264/DIG. 83 |
| 2019/0322789 A1 | * | 10/2019 | Lubitz .................... | C08G 18/12 |
| 2021/0340416 A1 | * | 11/2021 | Sun .................... | C08G 18/5024 |

FOREIGN PATENT DOCUMENTS

| | | | |
|---|---|---|---|
| CN | 106753151 | * | 5/2017 |
| CN | 108102059 | * | 6/2018 |

OTHER PUBLICATIONS

English language abstract CN 108102059 Jun. 2018.*
English language abstract CN 106753151 May 2017.*

* cited by examiner

*Primary Examiner* — Margaret G Moore
(74) *Attorney, Agent, or Firm* — Bayramoglu Law Offices LLC

(57) ABSTRACT

A graphene-modified elastomer material and its preparation method. The elastomer material comprises a first component and a second component; the first component comprises isocyanate prepolymer obtained through reaction of polyol and isocyanate, and the isocyanate prepolymer has a —NCO content of 22-30%; the second component comprises the following components in parts by weight: 60-90 parts of polyetheramine, 1-10 parts of liquid amine chain extender, 1-5 parts of polytetrahydrofuran ether polyol, and 1-5 parts of graphenes. Through adjusting the —NCO content of the isocyanate prepolymer, increasing the hard segment content, and combining with the components in the second component, the invention ensures the elasticity of the polymer while improving its mechanical properties such as hardness and bending strength.

20 Claims, No Drawings

GRAPHENE-MODIFIED ELASTOMER MATERIAL AND ITS PREPARATION METHOD

CROSS REFERENCE TO THE RELATED APPLICATIONS

This application is based upon and claims priority to Chinese Patent Application No. 2019101815996, filed on Mar. 11, 2019, the entire contents of which are incorporated herein by reference.

TECHNICAL FIELD

The invention relates to the technical field of polyurea materials, in particular to a graphene-modified elastomer material and its preparation method.

BACKGROUND

Polyurea material has high impact and wear resistance, and good anti-seepage effect, corrosion resistance and comprehensive mechanical properties. It has been widely used in national defense, civil engineering and water conservancy and hydropower projects.

Polyurea elastomer is a new type of green material developed in recent years to meet the needs of environmental protection. It is featured by rapid reaction and spray molding, and the raw material system does not contain solvent. With a fast curing speed, it can be continuously sprayed on the facade and curved surface for a thickness of more than ten millimeters without sagging.

Graphene is a two-dimensional nanomaterial composed of carbon atoms. It is a nanomaterial with high specific strength and hardness, and has a breaking strength of up to 130 GPa. In the prior art, graphene is used in combination with other materials to improve the mechanical properties of the material. However, graphene nanomaterials are easy to agglomerate at the nanometer scale, and have a poor compatibility with materials and weak interfacial bonding ability.

In view of this, this invention is specifically proposed.

SUMMARY

A first object of the invention is to provide a graphene-modified elastomer material which has excellent mechanical properties and good performance stability.

A second object of the invention is to provide a method for preparing the graphene-modified elastomer material. The operation of the preparation method is simple, the preparation conditions are mild, and the prepared elastomer material has good structural stability and excellent performance.

In order to achieve the above objects of the invention, the following technical solution is adopted:

A graphene-modified elastomer material comprises a first component and a second component;

The first component comprises isocyanate prepolymer obtained through reaction of polyol and isocyanate, and the isocyanate prepolymer has a —NCO content of 22-30%; the second component comprises the following components in parts by weight: 60-90 parts of polyetheramine, 1-5 parts of graphenes, 1-10 parts of liquid amine chain extender, and 1-5 parts of polytetrahydrofuran ether polyol.

The invention adjusts the —NCO content of isocyanate prepolymer to increase the hard segment content, thus reducing the soft segment content, increasing the content of urea bonds in the elastomer and the rigid chain segments, and improving the hardness, bending strength and other mechanical properties. Meanwhile, other components in the second component ensure the elasticity of the polymer while improving the mechanical properties.

Graphenes are added to the second component, and grafted into the elastomer material. With excellent mechanical properties, graphenes greatly improve the hardness and bending strength of the material if their added amount is within a certain range. Graphene has excellent mechanical properties, such as breaking strength up to 130 Gpa. After being grafted into the elastomer material, it greatly improves the mechanical properties of the material.

Preferably, the graphenes comprise one or more of surface-pretreated graphene, biomass graphene, and graphene oxide. More preferably, surface pretreatment comprises: a surface graft coupling agent of graphene and/or biomass graphene and/or graphene oxide. Titanate coupling agent, silane coupling agent or other coupling agents may be used. As the coupling conditions of silane coupling agent are mild, silane coupling agent is preferable. The mass of the coupling agent is 1-5% that of graphenes. Surface pretreatment is carried out for graphenes to increase inert surface activity and compatibility with organic substances and the like, and improve the performance of the elastomer material.

Graphene, biomass graphene, and graphene oxide can be obtained with a method in the prior art. Preferably, the number of layers is 1-10.

Preferably, the polytetrahydrofuran ether polyol has a number average molecular weight of 1,000 to 2,000, preferably from 1,000 to 1,500, more preferably 1,000.

Preferably, the functionality ratio of the first component to the second component is 1:(1-1.05).

Preferably, isocyanates include diisocyanate and/or triisocyanate. More preferably, isocyanates further include monoisocyanate. Further preferably, diisocyanate includes any one of p-phenylene diisocyanate, 4,4'-diphenylmethane diisocyanate, and toluene diisocyanate. Preferably, any one of p-phenylene diisocyanate and 4,4'-diphenylmethane diisocyanate, and more preferably, p-phenylene diisocyanate.

P-phenylene diisocyanate and 4,4'-diphenylmethane diisocyanate have a high symmetry and high degree of regularity. As a hard segment in the polymer, they are more likely to aggregate, and the hard segment has an increased molecular mass and increased crystallinity, thus improving the mechanical properties of the elastomer, such as tensile strength and tear strength.

Preferably, isocyanates comprise monoisocyanate, diisocyanate and triisocyanate with a molar ratio of (0.1-0.3):(6-10):(1-2). More preferably, isocyanates comprise monoisocyanate, diisocyanate and triisocyanate with a molar ratio of 0.2:(8-9):1.

Isocyanates include the above three types, which are blended in a certain ratio to make the molecular weight of the prepared prepolymer moderate and avoid the excessive molecular weight, which results in difficult mixing and spraying. Trifunctional reactants give the polymer a certain crosslinking density, bifunctional reactants provide a certain degree of crystallinity, and monofunctional reactants modulate the molecular weight, thus taking into account mechanical strength, hardness and elasticity, and avoiding elastic loss due to an excessively large cross-linking density, and improper mechanical strength due to an excessively small cross-linking density.

Preferably, the polyol comprises glycol and/or triol. More preferably, the polyol comprises glycol and triol with a molar ratio of (4-6):1.

Through the ratio of glycol to triol, the structure of the polymer is adjusted, and the crosslinking density and crystallinity are also considered, so that the polymer has good comprehensive properties.

Preferably, the polyol includes any one of polyester polyol and polyether polyol. More preferably, the polyol is polyether polyol.

Preferably, the polyether amine comprises any one or more of polyether triamine and polyether diamine. More preferably, the polyether amine comprises polyether triamine and polyether diamine with a mass ratio of 1:(2-4). The polyetheramine has a number average molecular weight of 400 to 5,000, preferably from 1,000 to 4,000, more preferably from 1,500 to 2,500.

The polyetheramine acts as a reactive soft segment and reacts with the isocyanate prepolymer to form urea-containing polymer. By adjusting the molecular weight of the polyetheramine, both the elasticity and strength of the polyurea are taken into consideration.

Preferably, the polyetheramine comprises terminal amino polyoxypropylene ether and/or terminal amino polyoxyethylene ether.

Preferably, the liquid amine chain extender comprises one or more of diethyl methane diamine, dimethyl toluene diamine and dialkethylene diamine.

The invention adopts a chain extender with small molecular weight to diffuse and elongate molecular chains and improve the mechanical properties of the polymer. The conventional chain extender has a large molecular weight, and the obtained polymer has a small molecular weight. In combination with other components, a chain extender with small molecular weight is used to increase the molecular weight, surface hardness, impact strength and other mechanical properties of the polymer.

The invention also provides a preparation method of elastomer material, comprising the following steps:

Heat and dehydrate the polyol, react with isocyanates at 50-90° C. for 2-3 h, and defoam to obtain the first component;

Mix polytetrahydrofuran ether polyol and graphenes uniformly, add polyether amine and liquid amine chain extender, mix them and heat to 50-90° C., and stir for 20-50 min to obtain the second component.

Preferably, mix polytetrahydrofuran ether polyol and graphenes and stir uniformly at the rotational speed of 1,000-1,200 rpm. More preferably, the stirring time is 15-30 min. Polytetrahydrofuran ether polyol and graphenes are mixed in advance, and polytetrahydrofuran ether polyol is used to uniformly disperse graphenes, thereby ensuring that graphenes are uniformly dispersed in the elastomer material.

Preferably, mix the first component and the second component with the supergravity mixing method, and spray to obtain the elastomer material.

The monomer of the components has a nanometer-sized uniformity during the reaction, so that the material has a micron-level closed-cell structure microscopically, and an isotropic honeycomb structure is obtained. When impacted, the pore walls bend to create linear elasticity, and when the critical stress is reached, the pores begin to collapse. Since it is an elastomer material, the collapse is caused by the elastic buckling of the pore walls, so it can restore, thereby increasing the strength of the elastomer material.

Preferably, heat the first component and the second component to 55-70° C., adjust the pressure to 30-40 MPa, mix with the supergravity mixing method, and spray to obtain the elastomer material.

By adjusting the temperature and pressure within the above range, the first component and the second component can be thoroughly mixed with the super-gravity mixing technique, and elastomer with a moderate pore size and good distribution uniformity of pores can be obtained, which contributes to further improvement of the strength of the elastomer.

Compared with the prior art, the beneficial effects of the invention are as follows:

(1) The invention adjusts the —NCO content of isocyanate prepolymer to increase the hard segment content, thus increasing the rigid chain segments in the elastomer, and improving the hardness, bending strength and other mechanical properties. Meanwhile, other components in the second component ensure the elasticity of the polymer while improving the mechanical properties;

(2) Graphenes are added to the components, and grafted into the elastomer material through coupling and other reactions. As hard segments, graphenes have excellent mechanical properties and are used to further improve the hardness and bending strength of the elastomer material;

(3) The operation of the preparation method of the invention is simple, and the preparation conditions are mild. By adjusting the temperature and pressure within the above range, the first component and the second component can be thoroughly mixed with the super-gravity mixing technique. The monomer of the components has a nanometer-sized uniformity during the reaction, so that the material has a micron-level closed-cell structure microscopically.

DETAILED DESCRIPTION OF THE EMBODIMENTS

The technical solutions of the invention will be clearly and completely described below in combination with the specific embodiments, but those skilled in the art will understand that the embodiments described below are a part of the embodiments of the invention, and not exhaustive. Such embodiments are intended to illustrate the invention and not to limit the scope of the invention. All other embodiments obtained by those skilled in the art based on the embodiments of the invention without creative efforts fall within the scope of protection of the invention. Conditions not specifically specified in the embodiments are conventional conditions or the conditions recommended by the manufacturers. Reagents or instruments used whose manufacturers are not indicated are commercially available conventional products.

The information about some reagents used in the embodiments of the invention is as follows:

Polyether triol, manufacturer: Bayer, model: ARCOL-5613;

Polyether glycol, manufacturer: Bayer, model: ARCOL-1011;

Polyether triamine, manufacturer: Hubei Qifei Pharmaceutical Chemical Co., Ltd., model: H362005;

Polyether diamine, manufacturer: Huntsman, model: T-3000;

Polytetrahydrofuran ether polyol, manufacturer: Mitsubishi Chemical, model: PTMG-1000;

Graphene oxide, manufacturer: Shandong Leadernano Tech Co., Ltd.

Embodiment 1

The elastomer material of this embodiment comprises the first component and the second component.

The first component comprises isocyanate prepolymer obtained through reaction of polyether polyol with methyl isocyanate, p-phenylene diisocyanate and triphenylmethane isocyanate, and the isocyanate prepolymer has a —NCO content of 25%;

The second component comprises the following components in parts by weight: 18 parts of polyether triamine, 56 parts of polyether diamine, 5 parts of diethyl methane diamine, 3 parts of polytetrahydrofuran ether polyol, and 3 parts of surface-pretreated graphene oxide.

The preparation method of the elastomer material comprises the following steps:

(1) Mix 30 g of polyether triol and 100 g of polyether diol uniformly, heat to 100-120° C. for dehydration for 2-3 h, then cool to 70° C., add 1 g of methyl isocyanate, 135 g of p-phenylene diisocyanate, 35 g of triphenylmethane isocyanate, react for 2-3 h under heat insulation conditions, and defoam and cool to obtain the first component with a —NCO content of 25±1%;

(2) Add 18 parts of polyether triamine, 56 parts of polyether diamine, 5 parts of diethyl methane diamine, 3 parts of polytetrahydrofuran ether polyol, and 3 parts of surface-pretreated graphene oxide into the stirring vessel, heat to 70° C., and stir uniformly for 30 min at the stirring speed of 400-500 rpm/min to obtain the second component;

The preparation method of the surface-pretreated graphene oxide comprises: carrying out ultrasonic dispersion of graphene oxide in absolute ethanol, preparing the coupling agent KH-560 into water solution with a mass fraction of 2%, adding hydrochloric acid to adjust the pH to 5, and adding it to the dispersed graphene oxide. After ultrasonic treatment, carry out reflux and reaction at 70° C. for 4 h, filter, rinse and dry it to obtain surface pre-treated graphene oxide;

(3) Weigh the first component and the second component at the reactive functionality ratio of 1:1.02 (the first component to the second component), mix the first component and the second component with a supergravity reactor, heat to 62° C., adjust the pressure to 36 MPa, keep the flow rate of 0.183 L/min, and spray onto the surface of the substrate to obtain the elastomer material.

Embodiment 2

This embodiment refers to the elastomer material and its preparation method of Embodiment 1, except that the —NCO content of the first component—isocyanate prepolymer is 22%;

The preparation method of the first component comprises: mixing 30 g of polyether triol and 100 g of polyether diol uniformly, heating to 100-120° C. for dehydration for 2-3 h, then cooling to 70° C., adding 0.8 g of methyl isocyanate, 110 g of p-phenylene diisocyanate, and 30 g of triphenylmethane isocyanate, reacting for 2-3 h under heat insulation conditions, and defoaming and cooling to obtain the first component with a —NCO content of 22±1%.

Embodiment 3

This embodiment refers to the elastomer material and its preparation method of Embodiment 1, except that the —NCO content of the first component—isocyanate prepolymer is 30%;

The preparation method of the first component comprises: mixing 30 g of polyether triol and 100 g of polyether diol uniformly, heating to 100-120° C. for dehydration for 2-3 h, then cooling to 70° C., adding 1.5 g of methyl isocyanate, 220 g of p-phenylene diisocyanate, and 55 g of triphenylmethane isocyanate, reacting for 2-3 h under heat insulation conditions, and defoaming and cooling to obtain the first component with a —NCO content of 30±1%.

Embodiment 4

This embodiment refers to the elastomer material and its preparation method of Embodiment 1, except that the first component comprises isocyanate prepolymer obtained through reaction of polyether polyol with p-phenylene diisocyanate, and the isocyanate prepolymer has a —NCO content of 25%;

The preparation method of the first component comprises:

Mixing 30 g of polyether triol and 100 g of polyether diol uniformly, heating to 100-120° C. for dehydration for 2-3 h, then cooling to 70° C., adding 150 g of p-phenylene diisocyanate, reacting for 2-3 h under heat insulation conditions, and defoaming and cooling to obtain the first component with a —NCO content of 25±1%.

Embodiment 5

This embodiment refers to the elastomer material and its preparation method of Embodiment 1, except that the first component comprises isocyanate prepolymer obtained through reaction of polyether polyol with methyl isocyanate, p-phenylene diisocyanate and triphenylmethane isocyanate, and the isocyanate prepolymer has a —NCO content of 25%;

The preparation method of the first component comprises: Mixing 30 g of polyether triol and 100 g of polyether diol uniformly, heating to 100-120° C. for dehydration for 2-3 h, then cooling to 70° C., adding 1 g of methyl isocyanate, 100 g of p-phenylene diisocyanate, and 125 g of triphenylmethane isocyanate, reacting for 2-3 h under heat insulation conditions, and defoaming and cooling to obtain the first component with a —NCO content of 25±1%.

Embodiment 6

This embodiment refers to the elastomer material and its preparation method of Embodiment 1, except that the first component comprises isocyanate prepolymer obtained through reaction of polyether polyol with methyl isocyanate, p-phenylene diisocyanate and triphenylmethane isocyanate, and the isocyanate prepolymer has a —NCO content of 25%;

The preparation method of the first component comprises: Mixing 120 g of polyether diol uniformly, heating to 100-120° C. for dehydration for 2-3 h, then cooling to 70° C., adding 1 g of methyl isocyanate, 100 g of p-phenylene diisocyanate, and 125 g of triphenylmethane isocyanate, reacting for 2-3 h under heat insulation conditions, and defoaming and cooling to obtain the first component with a —NCO content of 25±1%.

Embodiment 7

This embodiment refers to the elastomer material and its preparation method of Embodiment 1, except that the second component comprises the following components in parts by weight: 37 parts of polyether triamine, 37 parts of polyether diamine, 5 parts of diethyl methane diamine, 3 parts of polytetrahydrofuran ether polyol, and 3 parts of surface-pretreated graphene oxide.

Embodiment 8

This embodiment refers to the elastomer material and its preparation method of Embodiment 1, except that the second component comprises the following components in parts by weight: 74 parts of polyether diamine, 5 parts of diethyl methane diamine, 3 parts of polytetrahydrofuran ether polyol, and 3 parts of surface-pretreated graphene oxide.

Embodiment 9

This embodiment refers to the elastomer material and its preparation method of Embodiment 1, except that the second component comprises the following components in parts by weight: 15 parts of polyether triamine, 45 parts of polyether diamine, 1 parts of diethyl methane diamine, 1 part of polytetrahydrofuran ether polyol, and 1 part of surface-pretreated graphene oxide.

Embodiment 10

This embodiment refers to the elastomer material and its preparation method of Embodiment 1, except that the second component comprises the following components in parts by weight: 25 parts of polyether triamine, 65 parts of polyether diamine, 10 parts of diethyl methane diamine, 5 parts of polytetrahydrofuran ether polyol, and 5 parts of surface-pretreated graphene oxide.

Embodiment 11

This embodiment refers to the elastomer material and its preparation method of Embodiment 1, except that diisocyanate in the first component is 4,4'-diphenylmethane diisocyanate.

Embodiment 12

This embodiment refers to the elastomer material and its preparation method of Embodiment 1, except that diisocyanate in the first component is toluene diisocyanate.

Embodiment 13

This embodiment refers to the elastomer material and its preparation method of Embodiment 1, except that surface-pretreated graphene is used to replace surface-pretreated graphene oxide;
The method of surface pretreatment is similar to that in Embodiment 1, except that after surface-pretreated graphene oxide is obtained, chemical reduction is performed to obtain surface-pretreated graphene.

Embodiment 14

This embodiment refers to the elastomer material and its preparation method of Embodiment 1, except that surface-pretreated biamoss graphene is used to replace surface-pretreated graphene oxide; and the same method of surface pretreatment is adopted.

Comparative Example 1

The comparative example refers to the preparation method of Embodiment 1, except that the —NCO content of the first component—isocyanate prepolymer is 18%;
The preparation method of the first component comprises: mixing 30 g of polyether triol and 100 g of polyether diol uniformly, heating to 100-120° C. for dehydration for 2-3 h, then cooling to 70° C., adding 0.6 g of methyl isocyanate, 83 g of p-phenylene diisocyanate, and 22 g of triphenylmethane isocyanate, reacting for 2-3 h under heat insulation conditions, and defoaming and cooling to obtain the first component with a —NCO content of 18±1%.

Comparative Example 2

The comparative example refers to the preparation method of Embodiment 1, except that the second component comprises the following components in parts by weight: 18 parts of polyether triamine, 56 parts of polyether diamine, 15 parts of diethyl methane diamine, and 3 parts of surface-pretreated graphene oxide.

Comparative Example 3

The comparative example refers to the preparation method of Embodiment 1, except that the second component is not added with surface-pretreated graphene oxide.

Comparative Example 4

The comparative example refers to the preparation method of Embodiment 1, except that the second component is not added with polytetrahydrofuran ether polyol.

Experimental Example 1

In order to compare and explain the properties of the elastomer materials obtained in the embodiments and comparative examples of the invention, the following property tests were conducted for elastomer materials obtained in the embodiments and comparative examples, and the test results are shown in Table 1.

TABLE 1

Propety test results of different elastomer materials

| | Test items | |
|---|---|---|
| Test method | Shore hardness (D) ASTM D2240 | Bending strength (kgf/cm$^2$) ASTM D790 |
| Embodiment 1 | 83 | 203 |
| Embodiment 2 | 79 | 195 |
| Embodiment 3 | 85 | 200 |
| Embodiment 4 | 78 | 194 |
| Embodiment 5 | 80 | 194 |
| Embodiment 6 | 82 | 193 |
| Embodiment 7 | 79 | 191 |
| Embodiment 8 | 78 | 186 |
| Embodiment 9 | 73 | 190 |
| Embodiment 10 | 80 | 195 |
| Embodiment 11 | 75 | 197 |
| Embodiment 12 | 74 | 194 |
| Embodiment 13 | 85 | 202 |
| Embodiment 14 | 80 | 199 |
| Comparative example 1 | 70 | 181 |
| Comparative example 2 | 72 | 192 |
| Comparative example 3 | 66 | 182 |
| Comparative example 4 | 69 | 186 |

As can be seen from the above table, the invention adjusts the —NCO content of isocyanate prepolymer to increase the hard segment content, thus reducing the soft segment content, increasing the content of urea bonds in the elastomer and the rigid chain segments, and improving the hardness and bending strength; meanwhile, the elasticity of the polymer is ensured.

At the same time, graphenes are added to the second component, and grafted into the elastomer material, thus effectively improving the hardness and bending strength of the material.

Finally, it should be noted that the above embodiments are intended to illustrate the technical solutions of the invention and not to limit them; although the invention has been described in detail with reference to the embodiments, those skilled in the art should understand that the technical solutions described in the embodiments may be modified, or some or all of the technical features thereof may be equivalently substituted; however, such modifications or substitutions will not essentially make the corresponding technical solutions depart from the scope of technical solutions of the embodiments of the invention.

What is claimed is:

1. A graphene-modified elastomer material, comprising a first component and a second component; the first component comprises isocyanate prepolymer obtained through reaction of polyol and isocyanate, and the isocyanate prepolymer has a —NCO content of 22-30 wt %; the second component comprises the following components in parts by weight: 60-90 parts of polyetheramine, 1-5 parts of graphene, 1-10 parts of liquid amine chain extender, and 1-5 parts of polytetrahydrofuran ether polyol.

2. The graphene-modified elastomer material according to claim 1, wherein the graphene is at least one selected from the group consisting of surface-pretreated graphene, surface-pretreated biomass graphene, and surface-pretreated graphene oxide.

3. The graphene-modified elastomer material according to claim 2, wherein a surface pretreatment comprises: a surface graft coupling agent of graphene and/or biomass graphene and/or graphene oxide;
   the surface graft coupling agent is a silane coupling agent;
   a mass of the surface graft coupling agent is 1-5% of the graphene.

4. The graphene-modified elastomer material according to claim 3, wherein the graphene is the surface-pretreated graphene oxide.

5. The graphene-modified elastomer material according to claim 1, wherein a functionality ratio of the first component to the second component is 1:(1-1.05).

6. The graphene-modified elastomer material according to claim 1, wherein the polytetrahydrofuran ether polyol has a number average molecular weight of 1,000 to 2,000.

7. The graphene-modified elastomer material according to claim 1, wherein the liquid amine chain extender is at least one selected from the group consisting of diethyl methane diamine, dimethyl toluene diamine, and dialkethylene diamine.

8. A preparation method of the graphene-modified elastomer material according to claim 1, comprising the following steps:
   heating and dehydrating the polyol, reacting with isocyanates at 50-90° C. for 2-3 h, and defoaming to obtain the first component;
   mixing polytetrahydrofuran ether polyol and graphene uniformly, adding polyether amine and liquid amine chain extender, mixing them and heating to 50-90° C., and stirring for 20-50 min to obtain the second component.

9. The preparation method of the graphene-modified elastomer material according to claim 8, wherein the polytetrahydrofuran ether polyol and the graphene are mixed and stirred uniformly at a rotational speed of 1,000-1,200 rpm for a stirring time of 15-30 min.

10. The preparation method of the graphene-modified elastomer material according to claim 8, wherein the first component and the second component are heated to 55-70° C., adjusted to have a pressure of 30-40 MPa, mixed with a supergravity mixing method, and sprayed to obtain the graphene-modified elastomer material.

11. The preparation method of the graphene-modified elastomer material according to claim 8, wherein the graphene is at least one selected from the group consisting of surface-pretreated graphene, surface-pretreated biomass graphene, and surface-pretreated graphene oxide.

12. The preparation method of the graphene-modified elastomer material according to claim 11, wherein a surface pretreatment comprises: a surface graft coupling agent of graphene and/or biomass graphene and/or graphene oxide;
   the surface graft coupling agent is a silane coupling agent;
   a mass of the surface graft coupling agent is 1-5% of the graphene.

13. The preparation method of the graphene-modified elastomer material according to claim 12, wherein the graphene is the surface-pretreated graphene oxide.

14. The preparation method of the graphene-modified elastomer material according to claim 8, wherein a functionality ratio of the first component to the second component is 1:(1-1.05).

15. The preparation method of the graphene-modified elastomer material according to claim 8, wherein the polytetrahydrofuran ether polyol has a number average molecular weight of 1,000 to 2,000.

16. The preparation method of the graphene-modified elastomer material according to claim 8, wherein the liquid amine chain extender is at least one selected from the group consisting of diethyl methane diamine, dimethyl toluene diamine, and dialkethylene diamine.

17. The graphene-modified elastomer material according to claim 6, wherein the polytetrahydrofuran ether polyol has the number average molecular weight of 1,000 to 1,500.

18. The graphene-modified elastomer material according to claim 6, wherein the polytetrahydrofuran ether polyol has the number average molecular weight of 1,000.

19. The preparation method of the graphene-modified elastomer material according to claim 15, wherein the polytetrahydrofuran ether polyol has the number average molecular weight of 1,000 to 1,500.

20. The preparation method of the graphene-modified elastomer material according to claim 15, wherein the polytetrahydrofuran ether polyol has the number average molecular weight of 1,000.

* * * * *